(12) United States Patent
Ye et al.

(10) Patent No.: US 8,321,354 B2
(45) Date of Patent: Nov. 27, 2012

(54) SYSTEM, COMPUTER-IMPLEMENTED METHOD, AND SOFTWARE FOR VESSEL SCHEDULING FOR PRODUCT DISTRIBUTION

(75) Inventors: Jian Ye, Canton, MA (US); Mark Hartge, Boston, MA (US)

(73) Assignee: JDA Software Group, Inc., Scottsdale, AZ (US)

( * ) Notice: Subject to any disclaimer, the term of this patent is extended or adjusted under 35 U.S.C. 154(b) by 183 days.

(21) Appl. No.: 11/474,317

(22) Filed: Jun. 23, 2006

(65) Prior Publication Data

US 2008/0010357 A1    Jan. 10, 2008

(51) Int. Cl.
*G06Q 10/00* (2012.01)
(52) U.S. Cl. .................. 705/338; 700/217
(58) Field of Classification Search .................. 414/807; 700/100, 217; 701/117, 209; 703/14; 705/8, 705/40, 1; 707/100, 102; 364/424.01, 424.02, 364/436, 461
See application file for complete search history.

(56) References Cited

U.S. PATENT DOCUMENTS

| | | | |
|---|---|---|---|
| 5,177,684 A * | 1/1993 | Harker et al. ................. | 701/117 |
| 6,374,227 B1 | 4/2002 | Ye | |
| 6,980,885 B2 | 12/2005 | Ye et al. | |
| 2003/0060924 A1* | 3/2003 | Ye et al. ........................ | 700/217 |
| 2006/0195348 A1* | 8/2006 | Peterkofsky et al. ............. | 705/8 |
| 2006/0206387 A1* | 9/2006 | Peterkofsky et al. ........... | 705/22 |

OTHER PUBLICATIONS

Haddadi, S. & Ouzia, H. 2004. Effective algorithm and heuristic for the generalized assignment problem, European Journal of Operational Research, 153, pp. 184-190.*
Heuristic Scheduling Systems: With Applications to Production Systems and Prject Management, Thomas E. Morton & David W. Peutico, p. 27, 28, 102-106.
Beam Search, http://en.wikipedia.org/wiki/Beam_search, 1 page.
Backtracking, http://en.wikipedia.org/wiki/Backtrack, 2 pages.
Travelling Salesman Problem, http://en.wikipedia.org/wiki/Traveling_salesman_problem, 6 pages.
"Heuristic Scheduling Systems: With Applications to Production Systems and Project Management", Thomas E. Morton & David W. Pentico; Sep. 10, 1993, p. 27, 28, 102-106; Wiley-Interscience; 1 edition.
"Beam Search", http://en.wikipedia.org/wiki/Beam_search, Last Updated May 18, 2006, 1 page.
"Backtracking", http://en.wikipedia.org/wiki/Backtrack, Last Updated May 21, 2006, 2 pages.
"Travelling Salesman Problem", http://en.wikipedia.org/wiki/Travelling_salesman_problem, Last Updated Jun. 20, 2006, 6 pages.

* cited by examiner

*Primary Examiner* — Scott Zare
*Assistant Examiner* — Rokib Masud
(74) *Attorney, Agent, or Firm* — Booth Udall, PLC; Steven J. Laureanti

(57) ABSTRACT

A system, computer-implemented method, and software for automatically planning and scheduling ocean-going vessels for oil distribution is provided. The scheduling of the vessels is based on a filtered beam search and greedy heuristic. A server can be used for receiving a schedule request and one or more constraints for scheduling one or more vessels from one or more users. An optimization engine can be used for generating a schedule based at least in part on the one or more constraints using a beam search algorithm.

12 Claims, 4 Drawing Sheets

SYSTEM, COMPUTER-IMPLEMENTED METHOD, AND SOFTWARE FOR VESSEL SCHEDULING FOR PRODUCT DISTRIBUTION

BACKGROUND

1. Field of the Invention

The present invention relates generally to inventory management and in particular, to an apparatus and method for improving inventory levels and reducing inventory run-outs by optimizing product delivery scheduling and transport utilization.

2. Description of Related Art

It is a common and complex problem to transport various grades of oil from a refinery to one or more ports via one or more ocean-going vessels. The difficulty involves scheduling transport so that demand is met at each of the ports. It is important to avoid run-outs at the ports, but at the same time it is desirable to keep transport costs as low as possible. Scheduling excessive numbers of vessels and trips to avoid run-outs is not only inefficient and costly, but also runs the risk that vessel will be unavailable for making excessive numbers of trips. The ability to meet demand is constrained by vessel availability and capacity, as well as jetty and loading line availability at the ports. Thus, there are significant challenges involved in scheduling and planning for oil distribution.

SUMMARY OF THE INVENTION

There is a need in the art for providing a system for optimizing the planning and scheduling of ocean-going vessels for oil distribution. Therefore, it is an object of the present invention to provide a system, computer-implemented method, and/or software for automatically planning and/or scheduling ocean-going vessels for oil distribution.

This object is achieved by providing a system, computer-implemented method, and/or software for generating a schedule for delivery of products via an ocean-going vessel. According to a preferred embodiment of the present invention, a system, computer-implemented method, and software are provided for scheduling vessels for oil distribution based on a filtered beam search and greedy heuristic. A server can be used for receiving a schedule request and one or more constraints for scheduling one or more vessels. An optimization engine can be used for generating a schedule based at least in part on the one or more constraints using a beam search algorithm. The beam search algorithm orders terminal/product pairs according to criticality and uses possible vessel assignments as branches. It generates a branch search tree like a branch-and-bound tree, but uses heuristics instead of linear programming relaxation to choose best branches to explore and prune inferior branches. The generating of the schedule can include determining a vessel assignment according to a recursive process that includes determining the feasibility of assigning each of a plurality of vessel candidates to a terminal. The generating of the schedule can also include determining a vessel packing schedule using a depth-first with backtracking algorithm. The determining of the vessel packing schedule can include using a recursive function for assigning products to vessel compartments in order to obtain the best vessel utilization.

These and other advantages and features of the present invention will become readily apparent to those skilled in the art upon examination of the subsequent detailed description and accompanying drawings. For example, while embodiments of the present invention are described primarily within the context of ocean-going vessels for delivery of oil products, it will be appreciated that aspects of the present invention can be applied to other scenarios, for example involving alternative delivery vehicles and/or products, without departing from the spirit and scope of the present invention. Accordingly additional advantages and features of the present invention and the scope thereof are pointed out with particularity in the claims and form a part hereof.

DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

DETAILED DESCRIPTION OF THE PREFERRED EMBODIMENT

Reference will now be made to the following detailed description of the preferred and alternate embodiments of the present invention. Those skilled in the art will recognize that the present invention provides many inventive concepts and novel features, that are merely illustrative, and are not to be construed as restrictive. Accordingly, the specific embodiments discussed herein are given by way of example and do not limit the scope of the present invention.

Figure 1:
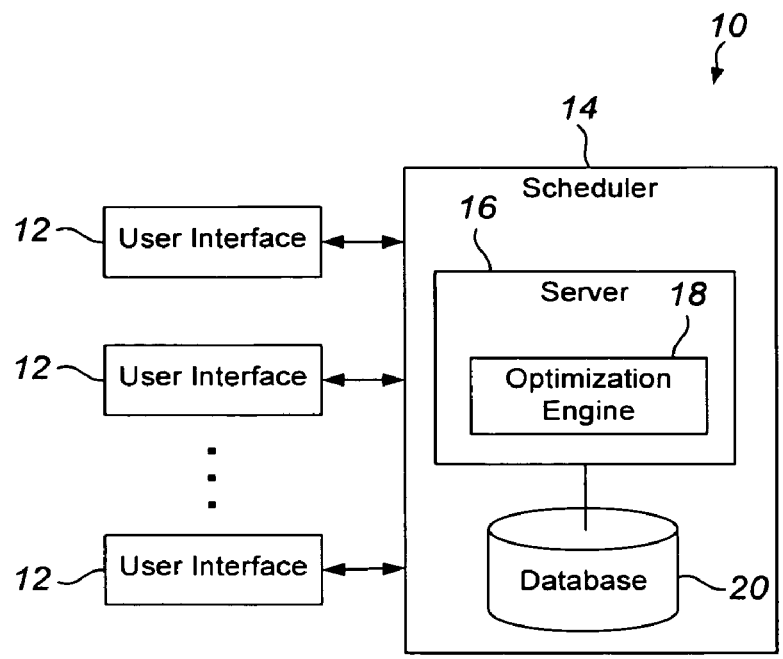
FIG. 1 illustrates a vessel scheduling system according to one embodiment of the present invention.

FIG. 1 illustrates an example distribution planning and scheduling system 10 for vessel scheduling. System 10 can include any number of user interfaces 12 and a scheduler 14. Scheduler 14 can include one or more servers 16 which can each include one or more computer systems. Server 16 can include one or more optimization engines 18 (which can be implemented as any suitable combination of hardware and/or software) which can generate schedules for oceangoing vessels. A user interface 12 can include a computer having a web browser, and the server 16 can include means for communicating with a user at the user interface 12 via the web browser.

Scheduler 14 can also include one or more databases 20 accessible to server 16 which can include inventory data, vessel data, location data, and any other suitable data. The inventory data can include available inventory over a planning horizon, a number of different products and types of products, and supply and demand information. The vessel data can include capacity, number of compartments, capacity of each compartment, product compatibility information for each compartment, vessel speed, and vessel availability information. Vessel data can also include transportation costs, typically based on distance, time, and/or volume. For example, a vessel can have a rate of $100 per nautical mile, so if it travels 100 miles, it will have a cost of 100*100=$10000. Location data can include information about origin and destination ports, such as port location, number of docks and loading lines at each port, and distances between ports. The database 20 can include any suitable data storage arrangement. In general, the optimization engine 18 can receive a schedule request from a user interface 12, process the schedule request, generate a vessel schedule for the schedule request, and communicate the generated vessel schedule to user interface 12 in a manner as described more fully below.

The oil distribution problem is an oil inventory routing problem. The goals are (1) maintain service level by minimizing run-outs (out of stock) at terminals; and (2) minimize unit transportation costs over a planning horizon. The main inputs can include (1) vessel information, for example: service area, compartment/product association, capacity, rates (typically based on distance traveled), speed (light and laden), and availability; (2) inventory information, for example: supply, on-hand inventory level for each oil product at a terminal, forecasted demand each day over the planning horizon for each terminal/product, and tank capacities; (3) dock and loading line information, for example: number of docks and loading lines available at a port and their availabilities, dock and vessel associations, and loading line and product associations. The outputs can include schedules for vessels, docks, loading lines, and projected inventory profiles for each terminal/product combination.

It is a difficult optimization problem. Theoretically, it is "NP hard," which means no efficient algorithms have been found to solve the problem to optimality. There are several important subproblems: (1) Vessel assignments: how to assign vessels to terminals. Planning horizon is typically more than 30 days, and a vessel can be reused multiple times; (2) Vessel packing: how to load oil products to maximize vessel utilization while respecting capacity constraints; and (3) Dock and loading line scheduling.

Overview: Beam Search

The vessel assignment problem is the most important and difficult subproblem. It is preferable to account for vessel capacity, terminal demands, and vessel availabilities. For example, if a terminal has high total demand, it is preferable to assign it a relatively large-capacity vessel to avoid run-outs. If several terminals are running out, but only one vessel is available, it is preferable to consider a multiple stop trip to supply these terminals. After assigning a vessel to a set of locations, finding the best sequence of stops is analogous to the "traveling salesman" problem. In some cases the number of stops is small, so one can simply enumerate all the possible sequences.

Given the complexity of the problem, a preferred embodiment uses a heuristic approach. It is designed to be robust enough to handle situations such as vessel breakdown/scheduled maintenance (fewer vessels available), demand surge (e.g., due to discount), congestions at docks. The overall framework is similar in nature to the branch-and-bound algorithm with limited width, or filtered beam search.

Figure 2:
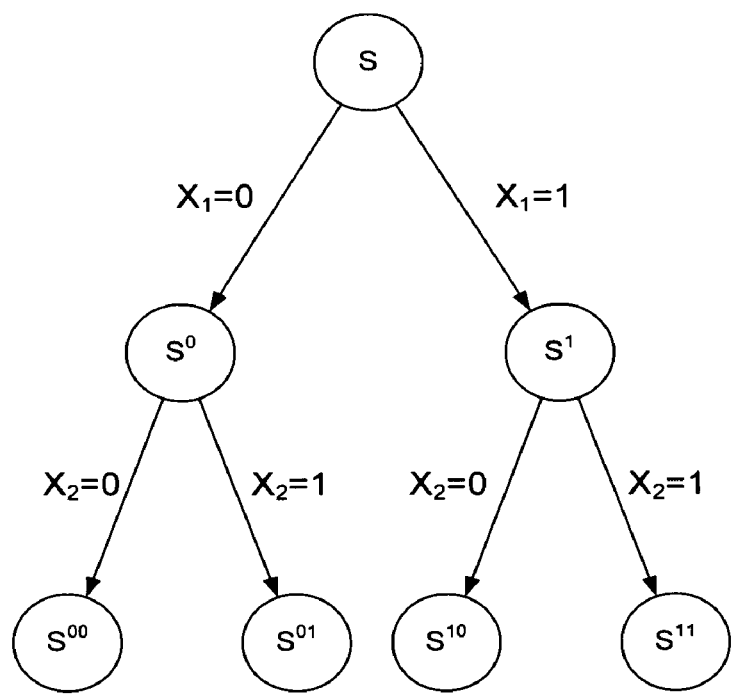
FIG. 2 illustrates a branch and bound diagram.

FIG. 2 shows a simple example of a branch-and-bound diagram for illustrating the branch-and-bound algorithm. The idea of the branch-and-bound algorithm with linear programming relaxation is basically enumerate through the whole solution space. After initial relaxation, the algorithm picks one variable from the set of all variables, say binary $X_1$, and divides the search into two subsets: $S^0$ and $S^1$ with $X_1=0$ and $X_1=1$ respectively. Each set is then solved by linear program (LP) relaxation and the procedure is applied recursively. The resulting tree with height=3 is shown in the FIG. 2.

To construct a branch-and-bound tree for the vessel scheduling problem, the terminal/product pairs are put in order according to their criticality, for example where criticality=run-out date−lead time. Lead time can be calculated as the sum of transit time and handling times (loading and unloading). The most critical terminal/product is selected to schedule. Possible vessel assignments are branches. A tree can be constructed as the procedure is applied recursively. For example, suppose there are two vessels: (V1, V2) and three terminals (T1, T2, T3) and just one product. There are 8 vessel assignments (branches) for T1 are (V1, T1), (V1, T1 T2), (V1, T1 T3), (V1, T1 T2 T3), (V2, T1), (V2, T1 T2), (V2, T1 T3), (V2, T1 T2 T3), where (V1, T1 T2) denotes a multiple drop movement using V1 starting at the refinery, making stops at T1 and T2. Multiple stops are common and desirable, for example, if vessel capacity for V1 is greater than tank capacities at T1, or V1 is the only vessel that can ship oil to T1 and T2 on time.

With more vessels and more terminals, the number of branches can easily be quite large, unlike the binary branch tree shown in FIG. 2. By also counting the number of different stop sequences, the number of possibilities can be even greater. For example, when V1 visits T1 and T2, there are two stop sequences: T1 first or T2 first. In general, there are n! possible sequences for n drop stops. Because of the large number of branches, it is desirable to limit the branch width k and heuristically determine the 'best' k branches and discard the rest.

In the branch-and-bound method with LP relaxation, if a node's best possible objective function value (obtained by LP relaxation) is greater than the current best solution value, the node is cut off (i.e., disregarded) from branch and bound tree. This bounding procedure helps prevent the exponential growth of the search tree. In the present heuristic approach, it is not necessary to have a lower bound at each node to work with. Instead, a greedy heuristic can be used to estimate how good a node is, and explore the search tree in a breath-first manner and only keep the best m nodes in each depth. This is analogous to the filtered beam search method, which is discussed in greater detail in T. E. Morton and D. W. Pentico, *Heuristic Scheduling Systems*, John Wiley and Sons, 1993, where m is the beam width and the branch width k is the filter. Details of the valuation function for each node are discussed below.

Figure 3:
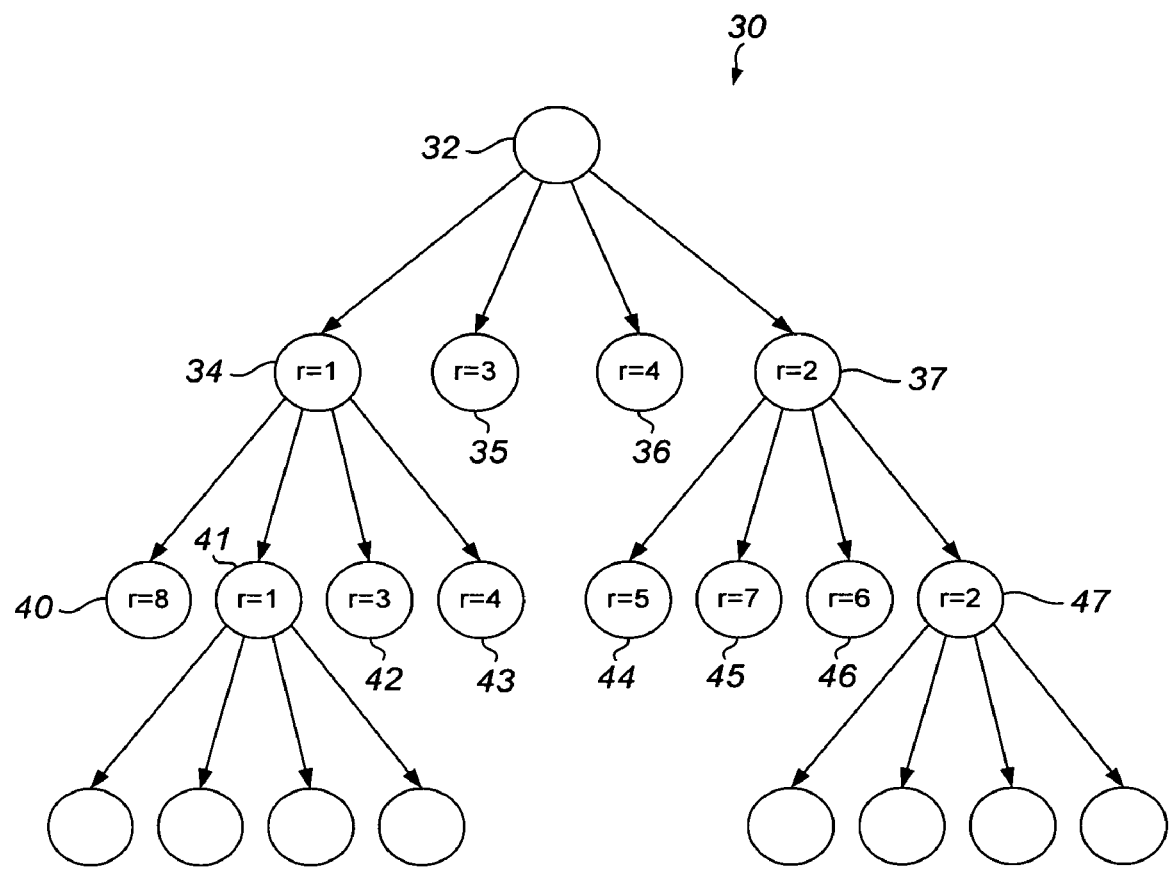
FIG. 3 illustrates a beam search tree according to the present invention.

FIG. 3 shows an example of a filtered beam search tree 30 for the vessel scheduling problem. In this example, the beam width=2 and the number of branches is limited to four. In this example, available vessels included vessels V1, V2, V3, V4, and V5, and terminals include terminals T1, T2, and T3, where terminal T1 is the most critical terminal to consider. Each of the branches to nodes 34-37 represent a possible vessel assignment to a terminal. The vessel assignment notation used in this discussion is as follows: [vessel]:[assigned terminal(s)]. So, for example, at the branch to node 34, vessel V1 is assigned to make stops at terminals T1 and T2, which is represented as V1:T1, T2. The remaining vessel assignments are as follows: the branch to node 35—V2:T1; the branch to node 36—V3:T1; and the branch to node 37—V4:T1. Additional branches are possible; for example, V5:T1 or V2:T1 and T2 and so on. The branches to nodes 34-37 were selected as the best four branches from among a greater number of possible branches based on how well they satisfied the first set of criteria. For example, the four best branches (to nodes 34-37) can be selected based on some criteria, such as near-term feasibility and/or best cost.

Each of the branch to nodes 34-37 is next given a ranking r representative of the desirability of the corresponding vessel assignment. According to a preferred embodiment, the rankings r are established by scheduling the for the next d days (e.g., d=30 days or d=20 days) using a simple and greedy heuristic: choose the best vessel assignment at each branch in a depth-first manner with no backtracking. The resulting ranking in the illustrated example has node 34 ranked highest (best) at r=1 and node 37 ranked second-highest (second best) at r=2.

Since beam width is two, only the best two branches (to nodes 34 and 37) are retained, while the rest are discarded. The two nodes 34 and 37 are then expanded to a next level of nodes 40-47, which are representative of further vessel assignments. For example, the vessel assignment V1:T1,T2 at the branch to node 34 is expanded to include the following vessel assignments: the branch to node 40=V2:T3; the branch to node 41=V3:T3; the branch to node 42=V4:T3; and the branch to node 43=V5:T3. Again, additional branches are possible, such as V2:T3,T4 or V6:T3, but since the number of branches is limited in this example to four, the four best branches (to nodes 40-43) are selected based on criteria, such as near-term feasibility and/or best cost. Similarly, node 37 is expanded to nodes 44-47. Next, since the beam width is set to two, the two highest ranking nodes from among nodes 40-47 are retained and the rest are discarded. Again, according to a preferred embodiment, the rankings r for nodes 40-47 are established by scheduling the for the next d days (e.g., d=30 days or d=20 days) using a simple and greedy heuristic: choose the best vessel assignment at each node in a depth-first manner with no backtracking. Additional layers of branches and nodes can continue to be generated as necessary to generate a completed schedule.

Vessel Packing

Before discussing the procedure of generating and ranking vessel assignments, the subproblem of vessel packing will be discussed. In vessel packing, it is desirable to first maximize vessel utilization subject to tank capacity constraints at terminals. For each terminal/product combination, the maximum that can be unloaded is the terminal's tank capacity less the terminal's inventory at the vessel's arrival time. If there is only one terminal, the second objective is to load each product (allowed by the number of compartments) proportionately so that they will run out at about the same time. Suppose that the goal is to achieve no run-outs for supplied products for next d days after replenishment. The minimum quantity to supply for a product is total demand for next d days less current inventory. So, the vessel packing problem has both min/max defined for each product subject to compartments constraints. The problem can be solved optimally using a depth-first with backtracking algorithm. A binary search can be used to find the best d (days of cover), starting with the end of planning horizon, for example 30 days. If 30 days doesn't work, next try 15 days. If 15 days works, try 22 days, and so on. If there is more than one terminal, equal number of days cover is no longer valid because one terminal's replenishment cycle can be two weeks, while another has one week cycle. It is desirable to remedy the potential problem with a procedure that redistributes product volumes.

Depth-first search and backtracking is a systematic way of generating all possible solutions to a combinatorial problem. In combinatorial search, a solution can be represented by a vector V=(v_1, . . . , v_n). In the vessel packing problem, the ith component would be the product and volume assigned to the ith compartment, for i=1, . . . , n. The search procedure works by growing solutions one element at a time. At each step in the search, a partial solution will be constructed with elements fixed for the first k elements of the vector, where k<=n. Next, the set of possible candidates S for (k+1)st position is constructed. The process then tries to extend the partial solution by adding the next element from S. As long as the extension yields a partial solution, the process continues to extend it. However, at some point, if S is empty, the process preferably backtracks to v_k, replacing it with the next candidate. This backtracking step gives the procedure its name. The search is depth-first because the process tries to extend the partial solution as far as possible. Depth first search is usually preferred because it requires minimum storage.

The following is an outline of the depth first search with backtracking for vessel packing:

```
Input:
Array: CompartmentCapacity for each compartment, 1,...,n
       MinimumToShip for each product , 1, ..., m
       MaximumToShip for each product, 1, ..., m
       ProductCompartmentAssociation for each product/compartment.
Output:
  1.   feasible packing exist: true or false
  2.   best packing: (product, volume) pair for each vessel compartment
VesselPacking( k ) # packing kth compartment
  1.   if k > n and remaining MinimumToShip[i]= 0, then
       feasiblePacking = true; record solution. Return.
  2.   Let S be the set of remaining products (i.e. MaximumToShip > 0)
       that can use compartment k
  3.   While S is not empty
       Let p be a product in S
       AssignProductToCompartment(p,k)
       VesselPacking( k+1)
       UnAssignProductToCompartment(p,k)
       S = S − p
       End While
```

Note the process is recursive in that the vessel packing process calls itself during the While loop. Input data for the process includes data for setting up the following arrays: (1) CompartmentCapacity for each compartment (1, . . . , n); (2) MinimumToShip for each product (1, . . . , m); (3) MaximumToShip for each product (1, . . . , m); and (4) ProductCompartmentAssociation for each product/compartment. The output of the process 30 includes (1) an indication as to whether feasible packing exists: true or false; and (2) best packing: (product, volume) pair for each vessel compartment.

The process begins for compartment k of the present vessel. Initially, k can be set to a value that is representative of the first compartment (e.g., k=1). The value of k will then increase for later instances of the process called during the While loop. Next, a check is made to determine whether k>n and the remaining MinimumToShip[i]=0. Recall that n represents the total number of compartments, so k>n means that all compartments have been processed. If not, then the vector S is set up to be a vector of remaining products for which MaximumToShip>0 and which are compatible with compartment k. While S is not empty, the While loop is performed. One of the products p is selected for consideration during the current iteration. Then a product p is assigned to compartment k according to the process shown in FIG. 4, which is described below. Next, k is incremented and the VesselPacking process is called.

Note that if k>n and the remaining MinimumToShip[i]=0 then the process returns to the point from which it was called. If it was called during an earlier occurrence of the While loop, UnAssignProductToCompartment(p,k) is performed, which is just the opposite of the AssignProductToCompartment(p,k) process shown in FIG. 4. Finally, product p is removed from vector S, and the while-loop begins again.

Figure 4:
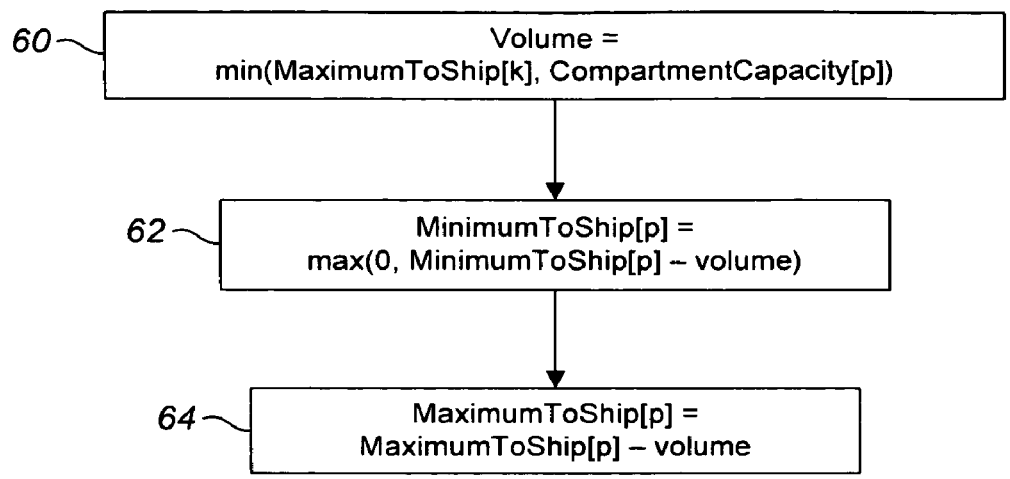
FIG. 4 illustrates in greater detail portions of the vessel packing process according to the present invention.

Turning now to FIG. 4, the process AssignProductToCompartment(p, k) begins at step 60 where the system computes volume=min(MaximumToShip[k], CompartmentCapacity [p]). Next, at step 62 MinimumToShip[p] is set equal to max(0, MinimumToShip[p]−volume. Finally, at step 64 MaximumToShip[p] is set equal to MaximumToShip[p]−volume.

Dock and Loading Line Scheduling

For a given vessel stop, the process will select a dock and loading lines so that the vessel can finish loading/unloading as early as possible if there are multiple docks/loading lines. Vessel stops can be scheduled on a first-come-first-serve basis. However, if a vessel is very critical (e.g., delaying it will cause run-outs), it will be given a higher priority and other vessels will be pushed out. For example, suppose there are two vessels V1 and V2 arriving at refinery at 1 am and 4 am respectively. Each vessel takes 10 hours to load and there is only one dock. Normally, the dock schedule would be:

[1:00, 11:00] V1
[11:00, 22:00] V2.

However, if V2 is more critical (e.g., must depart before 16:00 to prevent a run-out), then V2 will be inserted before V1 at the expense of more waiting for V1. The resulting schedule is

[4:00, 14:00] V2
[14:00, 24:00] V1.

The above first-come-first-served policy together with prioritization of critical movements works very well to reduce waiting times at docks.

Ranking and Evaluation of Vessel Assignments

It is preferable to generate and rank vessel assignments based on feasibility and unit cost. To schedule a delivery to a terminal, a preferred embodiment only considers vessels that can make the delivery on time before run-outs. If none exists, vessels will be considered that are only late for a day, and so on. When a vessel's capacity exceeds a terminal's tank capacities, it is natural to add another terminal to the vessel's destination list in order to improve vessel utilization. For example, if a vessel's capacity is 20000 barrels, while the total tank capacity at a terminal is only 10000 barrels, then the vessel can at best be half-filled (50% utilization) if the terminal is the only delivery. If a vessel's utilization is less than 90%, another terminal can be added. For performance reasons, it can be advantageous to only consider terminals that are in a "neighborhood" of the seed terminal. The neighborhood is usually defined by a radius (e.g., a radius of 300 nautical miles). The process adds one terminal at a time starting with the closest one until either utilization is 100% or the maximum number of stops is reached. For stop sequencing, the shortest route is selected without causing run-outs by solving a "traveling salesman" problem. Since the number of stops is typically small, one solution is to simply enumerate all permutations or use dynamic programming.

So, for each vessel, the process generates a vessel assignment candidate described above. It is preferable to check in the near term if a vessel assignment candidate will cause run-outs. For example, consider a vessel V, which is a candidate for terminal T1 and is at 100% utilization. However, terminal T2 is also running out and vessel V is the only feasible vessel candidate for T2. Assigning vessel V only to T1 will cause run-outs at T2. To avoid that, the schedule for vessel V should be modified by adding T2 as a stop. As another example, a vessel V is considered as a candidate for visiting terminals T1 and T2. Another terminal T3 is farther away from T1 than T2, but is running out earlier than terminal T2. If no other vessels are available, the only way to avoid the run-out at terminal T3 is to consider V for T1 and T3 instead of T1 and T2.

To check near term effects, it is preferable to only look ahead to the next N terminals to be scheduled where N is a small number such as 6. For a vessel candidate, the process checks if it is feasible as follows. First, it is assigned to its stops and its availability is updated. For the remaining terminals not already assigned, the process then recursively tries every possible vessel and, for each vessel, tries every possible two stops to see if a feasible schedule exists. The search is depth-first with backtracking. If a vessel candidate is not feasible, the process uses the same procedure to find a 2-stop candidate by checking every possible two stops with the other stop in the terminals considered.

Figure 5:
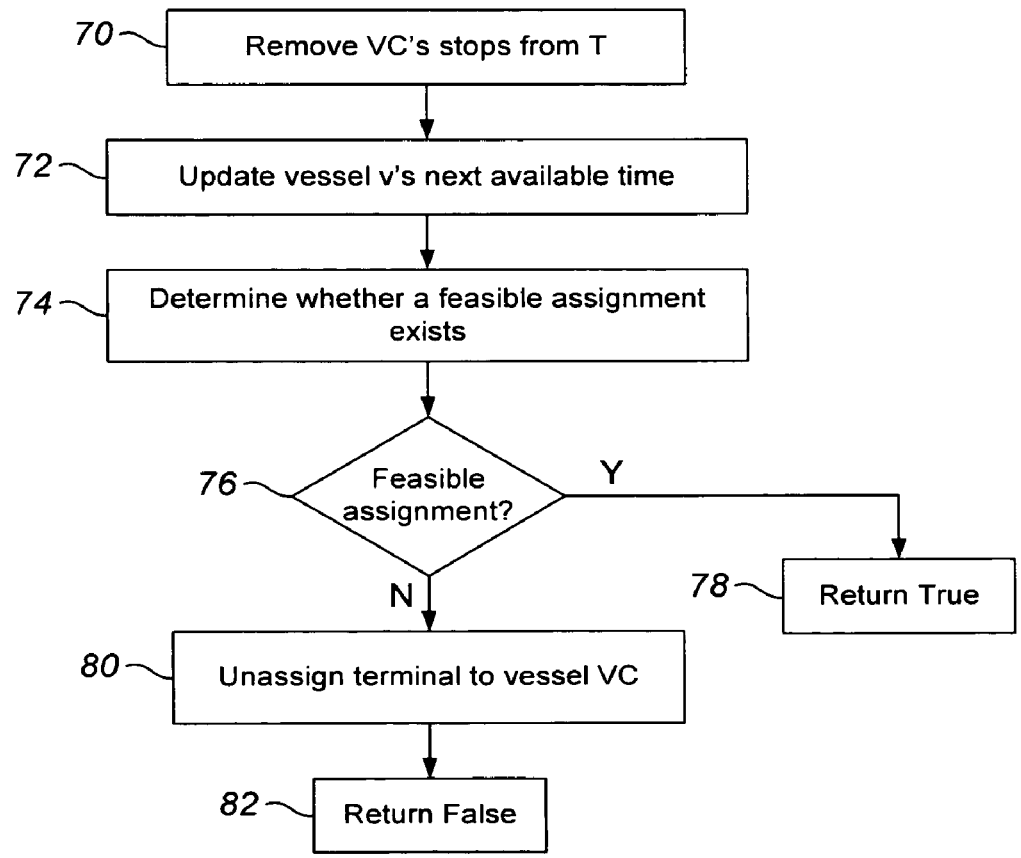
FIG. 5 illustrates a backtracking procedure to check the near term feasibility of a vessel candidate.

FIG. 5 shows a flowchart of the backtracking procedure to check the near term feasibility of a vessel candidate. Inputs for the process include (1) a list of Terminals: T; and (2) a vessel candidate: vessel v and its stops. The steps 70 and 72 are for assigning a terminal to vessel vc. At step 70, the vessel candidate vc's stops are removed from the list of terminals T. Then at step 72, the vessel vc's next available time is updated. At step 74, the system determines whether a feasible assignment exists, preferably using the process shown in FIG. 6 and described below. At step 76, if there is a feasible assignment then the process returns a "true" at step 78. Otherwise, the system unassigns the terminal to vessel VC at step 80 and returns a "false" at step 82.

Figure 6:
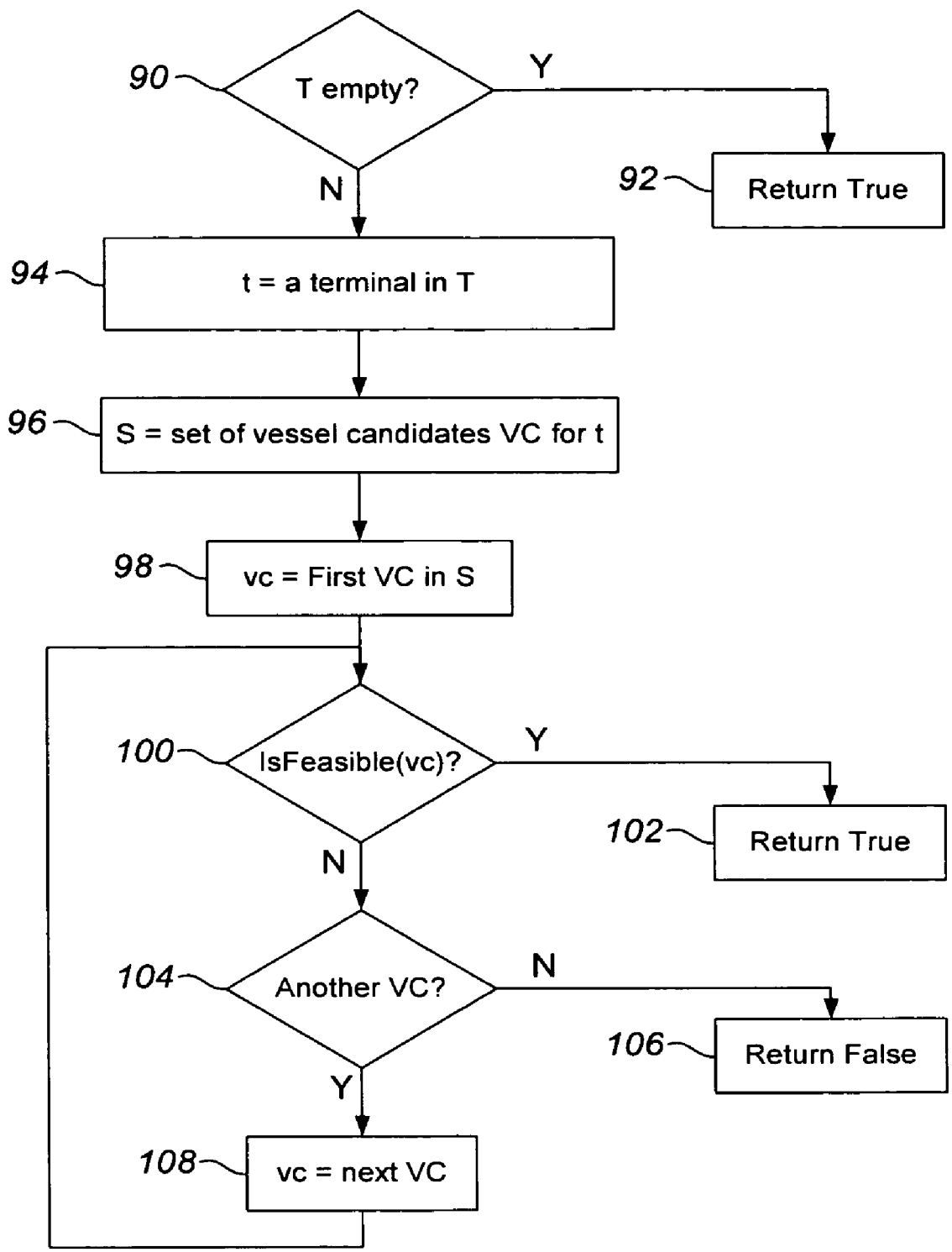
FIG. 6 illustrates a process for determining whether a feasible vessel assignment exists.

FIG. 6 shows a flowchart of a process for determining whether a feasible assignment exists (i.e., step 74). At step 90, the system checks whether the list of terminals T is empty. If so, then the process returns "true" at step 92. Otherwise, at step 94 the variable t is set equal to a terminal in T, and at step 96 a vector S is created that includes a set of vessel candidates VC for t. Steps 98 through 108 then cycle through the vessel candidates VC to check for feasibility. First, vc is set to the first vessel candidate VC in S at step 98. At step 100, a determination is made as to whether vc is a feasible candidate for terminal t. If so, the process returns "true" at step 102. Otherwise, at step 104 a check is made to determine whether there is another vessel candidate VC in the set S of vessel candidates. If not, then the process returns "false" at step 106. Otherwise, vc is set to the next vessel candidate VC in the set S and the process returns to step 100.

Vessel candidates are preferably ranked by feasibility, then by unit transportation cost. The unit transportation cost can simply be (total cost)/(total volume). In a preferred embodiment, only the first k vessel candidates are considered, and the rest of the vessel candidates are discarded.

To evaluate a vessel candidate, a schedule is generated for the next d days using the following heuristic: (1) End Date=Current Date+d days; (2) Select the most critical terminal; (3) Rank vessel candidates for the terminal by feasibility and unit cost, schedule the best one; and (4) Go back to 2 if next run-out date is less than End Date.

It is also possible in some cases to simply schedule all the way to the end of planning horizon. Parameter d can be used to improve performance. For example, choose d=20 days when the planning horizon is 40 days. For each schedule for next d days, the process can calculate the number of run-outs and the unit transportation cost for the whole plan. Vessel candidates can then be ranked again by the increasing order of the number of run-outs and unit transportation cost. At each level of the branch tree, only best m are kept. Even for m=1, the beam search procedure can be very effective.

Stop Insertion and Redistribute Shipment Volume

In the beam search method, the process described above only considered every possible 2-stops. However, sometimes it is desirable to have a 3-stop or 4-stop movement in order to prevent a run-out. In case no vessel can be found to make a delivery for a terminal on time, the process can check the feasibility of inserting the terminal into an existing movement. To do that, some or all vessels that stop at a terminal in the terminal's neighborhood can be considered. For each of these vessels, the additional terminal can be considered in every possible position. For example, the new terminal T3 can be considered for insertion into a movement refinery->

T1->T2 as refinery->T3->T1->T2 or T1->T3->T2 or T1->T2->T3. Preferably, only the shortest sequence that has no run-outs is selected. Again, all the possible vessel insertions as the above are considered and then the best one is selected.

In the vessel packing procedure, the assumption is that it is desirable to want to distribute volume so that all products will run out about the same time. This assumption is valid for one terminal, but not necessarily true for multiple terminals because they can have different replenishment cycles. To remedy this problem, every time a vessel is scheduled to a set of terminals, the process can find all previously scheduled movements to these terminals, sort these movements by decreasing order of time, and regenerate vessel packing for each of the movements.

As an example, suppose there are two terminals and one vessel. Terminal T1 has higher demand and requires one replenishment per week. Terminal T2 requires one visit every two weeks. When the vessel is scheduled for a multi-stop to terminals T1 and T2, the vessel capacity can be distributed to terminal T1 and terminal T2 so that each of them will last at least 9 days before run-out. Next, suppose another movement is scheduled to terminal T1 only. The vessel packing can be regenerated for the first movement to terminals T1 and T2. Since terminal T1 has another supply, both terminals T1 and T2 can be covered for 14 days. In other words, volume has been redistributed from terminal T1 to terminal T2.

It is apparent that an invention with significant advantages has been described and illustrated. Although the present invention is shown in a limited number of forms, it is not limited to just these forms, but is amenable to various changes and modifications without departing from the spirit thereof.

What is claimed is:

1. A system that generates a schedule for delivery of products via an ocean-going vessel, the system comprising:
    a computer system comprising a processor that receives a schedule request and one or more constraints for scheduling one or more vessels; and
    an optimization engine tangibly embodied on the computer system, the optimization engine generating a schedule comprising one or more vessel assignments to one or more terminals based on the one or more constraints using:
    a beam search algorithm comprising a branch-and-bound algorithm with a greedy heuristic estimating the desirability of one or more nodes, the branch-and-bound algorithm uses possible vessel assignments as branches and orders terminal/product pairs according to criticality,
    the optimization engine further verifies short term feasibility of a vessel candidate using a backtracking algorithm and determines the one or more vessel assignments according to a recursive process that includes determining the feasibility of assigning each of a plurality of vessel candidates to the one or more terminals.

2. The system of claim 1, wherein the optimization engine further determines a vessel packing schedule using a depth-first with backtracking algorithm.

3. The system of claim 2, wherein the optimization engine further uses a recursive function to assign products to vessel compartments in order to obtain an optimal vessel packing schedule.

4. The system of claim 1, wherein the beam search algorithm comprises evaluating a vessel candidate includes generating a schedule for a predetermined number of days d using the following heuristic:
    (1) set End Date=Current Date+d days;
    (2) select a critical terminal;
    (3) rank vessel candidates for the selected terminal based on feasibility and unit cost and schedule the best one; and
    (4) go back to step 2 when a next run-out date is before the End Date.

5. A method of generating a schedule for delivery of products via an ocean-going vessel, the method comprising:
    receiving, by a computer system comprising a processor, a schedule request and one or more constraints for scheduling one or more vessels;
    generating, by the computer system, a schedule comprising one or more vessel assignments to one or more terminals based on the one or more constraints using a beam search algorithm comprising a branch-and-bound algorithm with a greedy heuristic estimating the desirability of one or more nodes, the branch-and-bound algorithm using possible vessel assignments as branches and ordering terminal/product pairs according to criticality; and
    verifying, by the computer system, short term feasibility of a vessel candidate using a backtracking algorithm and determining the one or more vessel assignments according to a recursive process that includes determining the feasibility of assigning each of a plurality of vessel candidates to the one or more terminals.

6. The method of claim 5, further comprising:
    determining a vessel packing schedule using a depth-first with backtracking algorithm.

7. The method of claim 6, further comprising:
    using a recursive function to assign products to vessel compartments in order to obtain an optimal vessel packing schedule.

8. The method of claim 5, wherein the beam search algorithm comprises evaluating a vessel candidate includes generating a schedule for a predetermined number of days d using the following heuristic:
    (1) set End Date=Current Date+d days;
    (2) select a critical terminal;
    (3) rank vessel candidates for the selected terminal based on feasibility and unit cost and schedule the best one; and
    (4) go back to step 2 when a next run-out date is before the End Date.

9. A non-transitory computer-readable media embodied with software that generates a schedule for delivery of products via an ocean-going vessel, the software when executed by one or more computers is configured to:
    receive a schedule request and one or more constraints for scheduling one or more vessels;
    generate a schedule comprising one or more vessel assignments to one or more terminals based on the one or more constraints using a beam search algorithm comprising a branch-and-bound algorithm with a greedy heuristic estimating the desirability of one or more nodes, the branch-and-bound algorithm uses possible vessel assignments as branches and orders terminal/product pairs according to criticality; and
    verify short term feasibility of a vessel candidate using a backtracking algorithm and determine the one or more vessel assignments according to a recursive process that includes determining the feasibility of assigning each of a plurality of vessel candidates to the one or more terminals.

10. The computer-readable media of claim 9, wherein the software is further configured to determine a vessel packing schedule using a depth-first with backtracking algorithm.

11. The computer-readable media of claim 10, wherein the software is further configured to use a recursive function for assigning products to vessel compartments in order to obtain an optimal vessel packing schedule.

12. The computer-readable media of claim 9, wherein the beam search algorithm comprises evaluating a vessel candidate includes generating a schedule for a predetermined number of days d using the following heuristic:
 (1) set End Date=Current Date+d days;
 (2) select a critical terminal;
 (3) rank vessel candidates for the selected terminal based on feasibility and unit cost and schedule the best one; and
 (4) go back to step 2 when a next run-out date is before the End Date.

\* \* \* \* \*

UNITED STATES PATENT AND TRADEMARK OFFICE
CERTIFICATE OF CORRECTION

PATENT NO. : 8,321,354 B2
APPLICATION NO. : 11/474317
DATED : November 27, 2012
INVENTOR(S) : Jian Ye et al.

It is certified that error appears in the above-identified patent and that said Letters Patent is hereby corrected as shown below:

1. At Column 4, lines 41-61 the paragraph should read as indicated below:

Fig. 3 shows an example of a filtered beam search tree 30 for the vessel scheduling problem. In this example, the beam width=2 and the number of branches is limited to four. In this example, available vessels included vessels V1, V2, V3, V4, and V5, and terminals include terminals T1, T2, and T3, where terminal 1 is the most critical terminal to consider. Each of the branches to nodes 34-37 represent a possible vessel assignment to a terminal. The vessel assignment notation used in this discussion is as follows: [vessel]: [assigned terminal(s)]. So, if for example, at the branch node 34, vessel V1 is assigned to make stops at terminals T1 and T2, which is represented as V1:T1, T2. The remaining vessel assignments are as follows: the branch to node 35-V2:T1; the branch to node 36-V3:T1; and the branch to node 37-V4:T1. Additional branches are possible, for example, V5:T1 or V2:T1 and T2 and so on. The branches to nodes 34-37 were selected as the four best branches from among a greater number of possible branches based on how well they satisfied the first set of criteria. For example, the four best branches (to nodes 34-37) can be selected based on some criteria, such as nearterm feasibility and/or best cost.

2. At Column 6, lines 38-53 the paragraph should read as indicated below:

The process begins for compartment k of the present vessel. Initially, k can be set to a value that is representative of the first compartment (e.g., k=1). The value of k will then increase for later instances of the process called during the While loop. Next, a check is made to determine whether k>n and the remaining Minimum ToShip[i]=0. Recall that n represents the total number of compartments, so k>n means that all compartments have been processed. If not, then the vector S is set up to be a vector of remaining products for which MaximumToShip>0 and which are compatible with compartment k. While S is not empty, the While loop is performed. One of the products p is selected for consideration during the current iteration. Then a product p is assigned to compartment k according to the process shown in Fig. 4, which is described below. Next to k is incremented and the VesselPacking process is called.

Signed and Sealed this
Nineteenth Day of February, 2013

Teresa Stanek Rea
*Acting Director of the United States Patent and Trademark Office*